May 20, 1930.  R. C. DEALE  1,759,548
PLANER CONTROL SYSTEM
Filed Nov. 23, 1925  2 Sheets-Sheet 1

Inventor
R.C. Deale
By Wayne B. Wells
Attorney

May 20, 1930. R. C. DEALE 1,759,548
PLANER CONTROL SYSTEM
Filed Nov. 23, 1925 2 Sheets-Sheet 2

Inventor
R.C.Deale
By Wayne B. Wells
Attorney

Patented May 20, 1930

1,759,548

UNITED STATES PATENT OFFICE

ROBERT C. DEALE, OF PLAINFIELD, NEW JERSEY, ASSIGNOR, BY MESNE ASSIGNMENTS, TO GENERAL MACHINERY CORPORATION, OF HAMILTON, OHIO, A CORPORATION OF DELAWARE

PLANER-CONTROL SYSTEM

Application filed November 22, 1925. Serial No. 70,385.

My invention relates to control systems and particularly relates to control systems for governing the operation of planers.

In planers and similar machine tools a work carrying table is reciprocated by a main motor with respect to a cutting tool. The main motor is controlled by a pilot switch which in turn is controlled by dogs mounted on the work table. The feed motor for adjusting the position of the tool in many control systems is also controlled by the pilot switch.

One object of my invention is to provide a planer control system that shall effect a cutting stroke of the table at a less speed than the return stroke and that shall automatically vary the speed of the table movement during the cutting stroke so as to reduce the speed of the cutting stroke only when a cutting operation is being effected.

Another object of my invention is to provide a planer control system with resistors in the circuit of the main motor field winding for effecting the cutting and the return strokes of the table at different speeds and with means for connecting the main motor field windings across a source of power without the including of resistors upon starting the main motor and also upon abnormal loads being placed on the main motor.

Another object of my invention is to provide a planer control system having a motor generator set for supplying power to the main motor, a pilot switch for controlling the excitation of the motor-generator set to govern the main motor in accordance with the movement of the planer table, an auxiliary or pendent switch for controlling the excitation of the motor generator set to so control the main motor as to effect movement of the table at will, and means for energizing the main motor field magnet windings through a creep resistor when the pilot switch is in neutral position or when the pendent switch is being used to prevent creeping of the work table.

Another object of my invention is to provide a planer control system having a main motor and a feed motor supplied with power from a motor generator set, a pilot switch for controlling the direction of current flow through the field windings of the main generator in the motor generator set to govern the direction of rotation of the main motor in accordance with the movement of the table, means for selectively operating the feed motor at only one end of the table stroke, and means for effecting a delayed feeding movement when the feed motor is operated at the end of the cutting stroke and a quick feeding operation when the feed motor is operated at the end of the return stroke.

Another object of my invention is to provide a planer control system of the above indicated character having the main motor and the feed motor supplied with power from a motor-generator set that shall have a torque resistor initially included in the circuit of the feed motor and means for excluding said torque resistor from the feed motor circuit after a limited movement of the feed motor and before a feeding movement takes place.

A further object of my invention is to provide a planer control system of the above indicated character having the main motor and the feed motor supplied with power from a motor-generator set that shall start the operation of the feed motor by the pilot switch and limit the movement of the feed motor by a limit switch irrespective of the operative position of the pilot switch and that shall operate the pilot switch at one end of the table stroke to prepare a circuit for operating the feed motor and operate the pilot switch at the opposite end of the table stroke to complete the feed motor circuit.

In a control system constructed in accordance with my invention the main motor, which reciprocates the work carrying table of the planer, is supplied with current by the main generator of a motor-generator set. The field windings of the main planer motor and the field windings of the generator are energized by an exciter which is operated by the motor of the motor-generator set. The exciter also supplies power for operating the feed motor. A pilot switch, which is operated by dogs mounted on the work table, controls the direction of current flow through the field windings of the generator on the motor-generator set to control the direction of rotation of the main motor in accordance with the table movement. The pilot switch also operates two auxiliary feed switches which in turn operate the main feed switches. One auxiliary feed switch is operated by the pilot switch, at one end of the planer stroke to prepare a circuit for operating the main feed switches. At the opposite end of the stroke the pilot switch completes the circuit through the operated auxiliary feed switch to effect operation of the main feed switches and the feed motor. The auxiliary feed switches are alternately operated and the length of the feeding operation is controlled solely by a limit switch under the control of the feed motor. The pilot switch starts the operations of the feed motor and the limit switch stops the feed motor irrespective of the operative position of the pilot switch.

Operation of the feed motor is only effected at one end of the table stroke and the end of the stroke at which feeding takes place is selectively controlled by means of a selector switch. If feeding takes place at the end of the cutting stroke a delayed feeding movement is effected and if feeding takes place at the end of the return stroke a quick feeding operation is effected.

A torque resistor, which is independent of the accelerating resistor, is included in the circuit of the feed motor. The torque resistor is excluded from the feed motor circuit after a predetermined movement of the feed motor by a switch which is mechanically operated by the feed motor. It has been found that small feeds can only be accurately obtained by giving the motor a small movement prior to the feeding movement. The initial movement of the feed motor is effected with the torque resistor included in its circuit.

The pilot switch also controls resistors included in the circuit of the main motor field magnet winding to effect a return stroke of the work table at a greater speed than a cutting stroke. Moreover means is provided for controlling such resistors during the cutting stroke so that a slow speed of the table is effected only when a cutting operation on the work is being effected. Preferably the resistors are controlled during a cutting stroke by means of dogs mounted on the table.

Means is also provided in the control system disclosed for short circuiting the resistors included in the field winding circuit of the main motor when starting and when an abnormal load is placed on the main motor. Preferably a switch, having an energizing coil in series with the main motor armature, is provided for directly connecting the main motor field windings across the exciter generator when starting the main motor and when an abnormal load is placed on it.

Provision is also made in the control system for connecting the main motor field windings across the exciter generator in series with a creep resistor when the pilot switch is in a neutral position and also whenever the pendent switch is operated. Such resistor will cut down the field current and greatly reduce the tendency of the motor to creep.

Although my invention has been described by means of a planer control system controlled by a motor generator set it is to be understood that many of the disclosed features may be equally well applied to other types of planer control systems. A planer adapted to be operated by my control system is disclosed in the application of Clifford F. Randolph, Serial No. 56,397, filed September 14, 1925.

Figure 1:
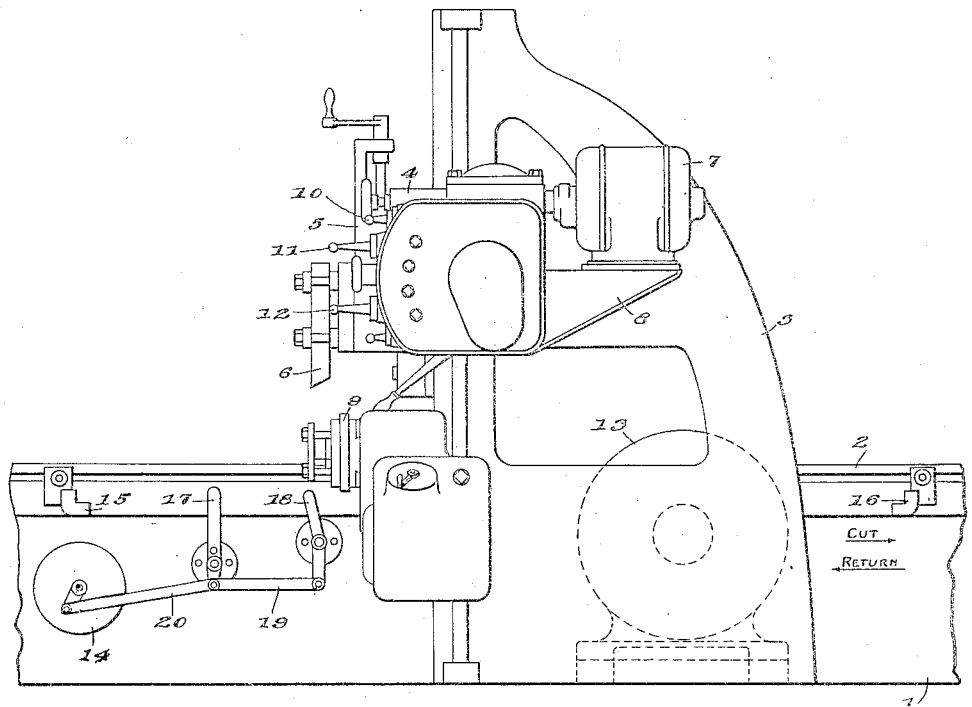
Figure 1 is a side elevational view of a planer operated by a control system constructed in accordance with my invention.
Figure 2:
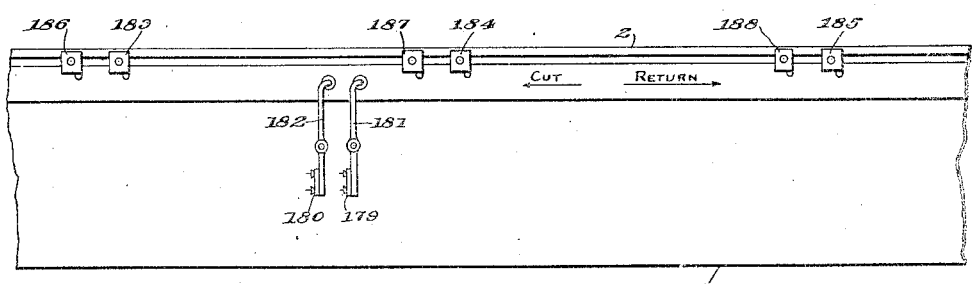
Fig. 2 is an elevational view of the table and planer bed taken from the opposite side from Fig. 1 showing the dogs and levers for controlling the table speed during a cutting stroke.

Referring to the drawings and particularly to Figs. 1 and 2, a planer is illustrated comprising a bed 1 having a reciprocating work carrying table 2 mounted thereon. Uprights 3, one only of which is illustrated, extend above the bed 1, and carry a cross rail 4. Tool heads 5, one only of which is illustrated on the drawings, are slidably mounted on the cross rail 4. The tool heads 5 carry suitable cutting tools 6 for operating on the work carried by the reciprocating table 2. A feed motor 7, which is mounted on the bracket 8, extending from the cross rail 4, is provided for effecting feeding and traversing movements of the tool heads 5 for raising and lowering the cross rail 4 on the uprights 3 and for effecting feeding movements of the side heads 9, one only of which is illustrated on the drawings. The raising and lowering of the cross rail 4 is controlled by a lever 10 and the movements of the tool heads 5 are controlled by levers 11 and 12.

The reciprocating table 2 is operated by a main motor 13 under the control of a pilot switch 14. The pilot switch 14 is controlled by two dogs 15 and 16, which are carried by the reciprocating table 2. At the end of the cutting stroke the dog 15 engages a lever 17 for operating the pilot switch 14 in one direction and at the end of the return stroke the dog 16 engages a lever 18 for operating the pilot switch in an opposite direction. The two levers 17 and 18, which are pivotally mounted on the bed 1, are connected to the pilot switch 14 by means of links 19 and 20.

Figure 3:
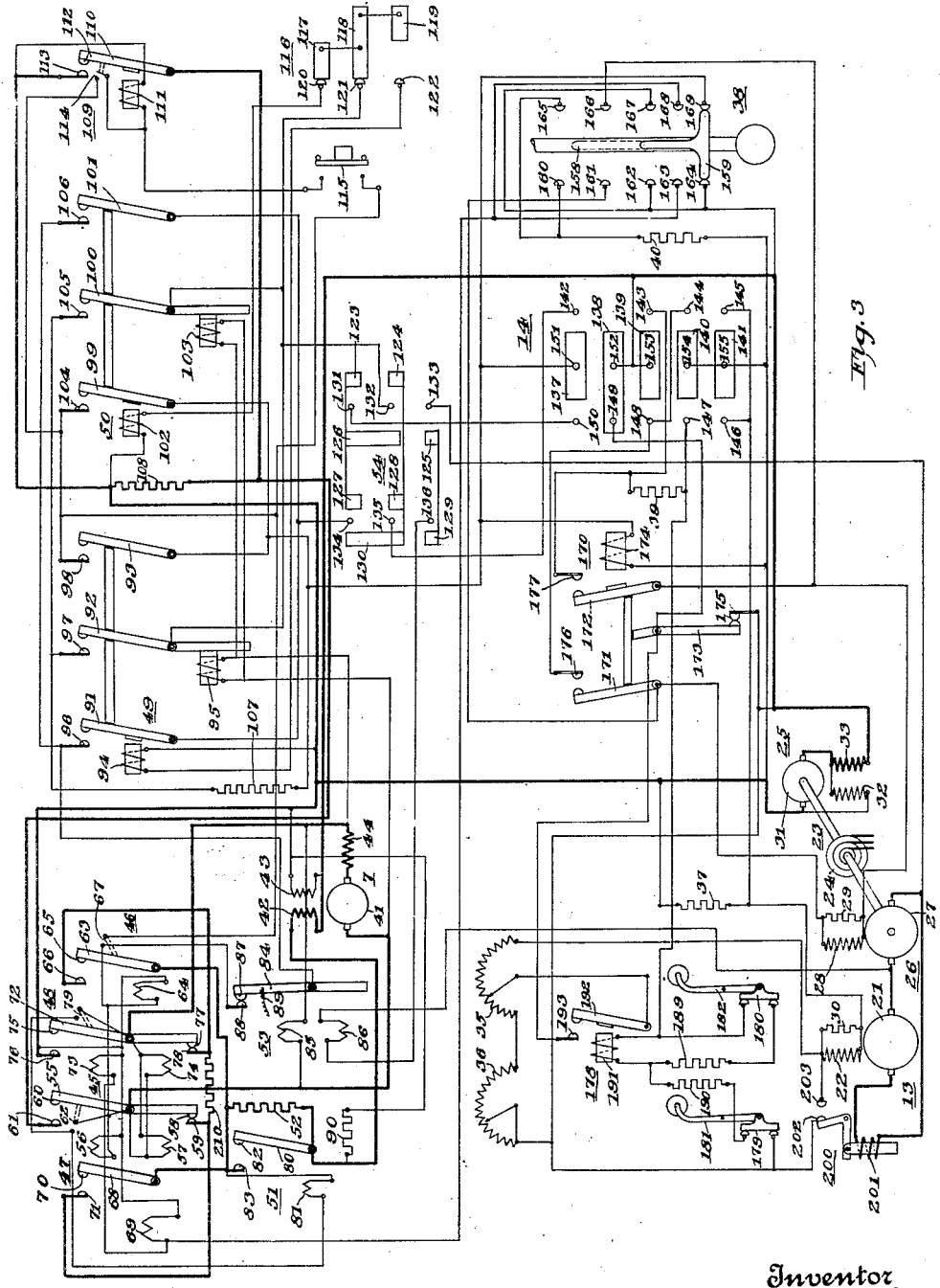
Fig. 3 is a diagrammatic view of the circuits of a planer control system constructed in accordance with my invention.

Referring to Fig. 3 of the drawings, the main motor 13 is shown comprising an armature 21 and a field-magnet winding 22. A motor-generator set 23, comprising a motor 24, an exciter generator 25, and a main generator 26, is provided for supplying power not only to the main motor 13 but also the feed motor 7. The main generator 26 comprises an armature 27, which is directly connected to the armature 21 of the main motor 13 and a field-magnet winding 28 which is energized by the exciter generator 25. A choke resistor 29 is connected across the field-magnet winding 28. A choke resistor 30 is connected across the field-magnet winding 22. The exciter generator 25 comprises an armature 31, a shunt field-magnet winding 32, and a series field-magnet winding 33. The main generator 26 and exciter generator 25 are preferably mechanically connected to the motor 24 as diagrammatically illustrated in Fig. 3 of the drawings. The two resistors 35 and 36 are connected in circuit with the main motor field-magnet winding 22 for effecting the cutting stroke and the return stroke of the planer table 2 at different rates. A creep resistor 37 is connected in circuit with the motor field-magnet winding 22 when the pilot switch 14 is in a neutral position and when a pendent switch 38 is operated. A resistor 39 is connected in circuit with the field-magnet winding 28 of the main generator to reduce the generator voltage on the return stroke. A resistor 40 is connected in circuit with the generator field-magnet winding 28 whenever the pendent switch 38 is operated.

The feed motor 7 comprises an armature 41, a series field-magnet winding 42, a shunt field-magnet winding 43, and an interpole winding 44. The feed motor 7 is controlled by two feed switches 45 and 46 and two traverse switches 47 and 48. The two feed switches in turn are controlled by two auxiliary feed switches 49 and 50 which are directly controlled by the pilot switch 14. An accelerating switch 51 is provided for short circuiting a resistor 52 to effect automatic acceleration of the feed motor 7. A switch 53, which is controlled by a selector switch 54, is provided for effecting a delayed feeding movement when the feed motor 7 is operated at the end of the cutting stroke. In the system disclosed a movement of the feed motor is only effected at one end of the table stroke. The end of the stroke at which the feeding movement takes place is selectively controlled by means of the selector switch 54 in a manner to be hereinafter set forth.

The feed switch 45 comprises a switch arm 55, which is operated by a main magnet 56 and a holding magnet 57. A contact member 58, which is mounted on the switch arm 55, engages a stationary contact member 59 in the released position of the switch arm and a contact member 60, which is mounted on the switch arm, engages a stationary contact member 61 in the operative position of the switch arm. An auxiliary switch 62 is operated by the switch arm 55 for completing an energizing circuit to operate the accelerating switch 51. The feed switch 46 comprises a switch arm 63, which is operated by a main magnet 64. The switch arm carries a stationary contact member 65 for engaging a contact member 66 in the operative position of the switch. An auxiliary switch 67 is operated by the switch arm 63 for completing a holding circuit for the auxiliary feed switches 49 and 50.

The traverse switch 47 comprises a switch arm 68, which is operated by a main coil 69. The switch arm 68 carries a contact member 70 which engages a stationary contact member 71 in the operative position of the switch. The traverse switch 48 comprises a switch arm 72, which is operated by a main magnet 73 and a holding magnet 74. The switch arm 72 carries a contact member 75 which engages a stationary contact member 76 in the operative position of the switch and a contact member 77 which engages a stationary contact 78 in the released position of the switch. An auxiliary switch 79 is operated by the switch arm 72 for completing an energizing circuit to operate the accelerating switch 51.

The accelerating switch 51 comprises a switch arm 80, which is operated by a main magnet 81. The switch arm 80 carries a contact member 82 which is adapted to engage a stationary contact member 83 in the operative position of the switch. The switch 53, which effects a delayed feeding at the end of the cutting stroke comprises a switch arm 84 and two magnets 85 and 86. The switch arm carries a contact member 87, which engages a stationary contact member 88 in the operative position of the switch. A spring member 89 is provided for exerting a force normally tending to hold the switch arm 84 in closed position. A choke resistor 90 is connected across the shunt field magnet-winding 43 for taking care of inductive discharges.

The auxiliary feed switch 49 comprises three switch arms 91, 92 and 93 which are operated by a main magnet 94 and a holding magnet 95. In the operative position of the switch, the switch arms 91, 92 and 93 respectively engage stationary contact members 96, 97 and 98. The auxiliary feed switch 50 comprises three switch arms 99, 100 and 101 which are operated by a main magnet 102 and a holding magnet 103. In the operative position of the switch, the switch arms 99, 100 and 101 respectively engage stationary contact members 104, 105 and 106. A resistor 107 is provided in the holding circuit for the two auxiliary feed switches 49 and 50.

A torque resistor 108, which is initially included in the circuit of the feed motor 7, is controlled by a switch 109. The switch 109 comprises a switch arm 110 which is operated by a magnet 111. The switch arm carries a contact member 112 which engages a stationary contact member 113 in the operative position of the switch. An auxiliary switch 114 is operated by the switch arm 110 for completing a holding circuit through the magnet 111. A switch 115, which is mechanically closed after a predetermined rotation of the feed motor, is provided for closing the energizing circuit for the magnet 111.

A limit switch 116, which is operated by the feed motor 7, is provided for limiting the feeding movements of the feed motor 7. The limit switch 116 comprising three contact segments 117, 118 and 119, which are adapted to engage contact fingers 120, 121 and 122. The selector switch 54 comprises contact segments 123 to 130, inclusive, which are adapted to engage contact fingers 131 to 136, inclusive.

The pilot switch 14, which is operated by dogs 15 and 16 mounted on the table 2, comprises contact segments 137 to 141, inclusive, which are adapted to engage contact fingers 142 to 155, inclusive. The pendent switch comprises two contact segments 158 and 159 which are adapted to engage stationary contact fingers 160 to 169, inclusive.

A main generator field switch 170 is provided for preventing any control of the system by the pilot switch 14 when the pendent switch 38 is being operated. The switch 170 comprises three switch arms 171, 172 and 173 which are operated by a magnet 174. In the released position of the switch the switch arm 173 is adapted to engage a stationary contact member 175, and in the operative position of the switch the switch arms 171 and 172 respectively engage stationary contact members 176 and 177.

A contactor 178, which is controlled by two switches 179 and 180, is provided for varying the speed of the main motor 13 during a cutting stroke. The two switches 179 and 180 are operated by two switch arms 181 and 182 which have rollers mounted on the ends thereof for engaging dogs mounted on the back side of the work table 2. The switch arm 181 is adapted to be operated by dogs 183, 184 and 185 and the switch arm 182 is adapted to be operated by dogs 186, 187 and 188. Preferably the dogs 183 to 188, inclusive, are mounted on the side of the table 2 opposite to the dogs 15 and 16 which control the pilot switch 14. Two resistors 189 and 190 are adapted to be connected in parallel and in series with the magnet 191 of the contactor 178. The contactor 178 comprises a switch arm 192, which is adapted to engage a stationary contact member 193 in the operative position of the contactor.

Assume the pilot switch 14 to be moved towards the right, as viewed in Fig. 3 of the drawings, at the end of the cutting stroke to effect a return stroke by the table 2 and the selector switch 54 to be moved towards the left, as viewed in Fig. 3 of the drawings, to effect a feeding movement at the end of the return stroke. The contact segment 141 of the pilot switch engages the contact finger 145 for completing a circuit through the field-magnet winding 22 of the main motor 13. The circuit through the winding 22 extends from one terminal of the exciter armature 31, through the contact segment 141, contact fingers 155 and 145, field-magnet winding 22, resistors 35 and 36, and the series field-magnet winding 33, to the other terminal of the exciter armature 31. The two resistors 35 and 36 are included in the circuit of the shunt field-magnet winding 22 in order to effect the return stroke of the planer table at a relatively rapid rate. The contact segments 139 and 140 engage contact fingers 143 and 144 for connecting the field-magnet winding 28 of the main generator 26 across the exciter generator. At this time it may be noted the magnet 174 of the switch 170 is energized by a circuit which extends from one terminal of the exciter armature 31 through the magnet 174, contact fingers 169 and 164 of the pendent switch, which are bridged by the contact segments 159, and the series field winding 33 to the other terminal of the armature 31. The circuit completed by the contact segments 139 and 140 extends from one terminal of the exciter armature 31 through the contact fingers 154 and 144, which are bridged by the contact segment 140, contact member 176, switch arm 171, generator field-magnet winding 28, switch arm 172, contact member 177, contact fingers 143 and 153, which are bridged by the contact segment 139, and the series field-magnet winding 33 to the other terminal of the exciter armature 31.

When the pilot switch is moved towards the left, as viewed in Fig. 3 of the drawings, at the end of the return stroke to effect a cutting stroke, the contact segment 141 engages the contact finger 146. At this time a circuit is completed through the main motor field-magnet winding 22 which extends from one terminal of the exciter armature 31 through the contact fingers 155 and 146, which are bridged by the contact segment 141, main motor field-magnet winding 22, resistor 35, switch arm 192, contact member 193, contact fingers 149 and 152, which are bridged by the contact segment 138 and the series field-magnet winding 33 to the other terminal of the exciter armature 31. The contactor 178 is normally in a closed position and the operation thereof by the switches 179 and 180 will be described hereinafter.

The contact segments 139 and 140 when moved to the left, as viewed in Fig. 3 of the drawings, at the end of the return stroke to effect a cutting stroke, complete a circuit for reversing the current flow through the field-magnet winding 28 of the main generator 26. The circuit completed by the contact segments 139 and 140 extends from one terminal of the armature 31 through the contact fingers 154 and 147, which are bridged by the contact segment 140, resistor 39, contact member 177, switch arm 172, winding 28, switch arm 171, contact member 176, contact fingers 148 and 153, which are bridged by the contact segment 139, and the series field-magnet winding 33 to the other terminal of the exciter armature 31. At this time it will be noted the resistor 39 is included in the circuit of the winding 28 to reduce the voltage supplied to the main motor 13. It should also be noted the current flow through the generator field-magnet winding 28 is reversed to reverse the direction of rotation of the main motor 13.

The contactor 178, which is operated by the switches 179 and 180, serves to vary the speed of the main motor 13 in accordance with the character of the work carried by the table 2. In effecting the cutting stroke it is desirable to operate the table 2 at slow speed only when the cutting tool 6 is actually effecting a cutting operation on the work. The dogs 183 to 188, inclusive, which are shown in Fig. 2 of the drawings, are positioned on the table 2 in accordance with the cutting operation to be effected. Any number of such dogs may be placed on the side of the table and are positioned so as to operate the switch arms 181 and 182 in accordance with the speed of the main motor which is desired. The dogs 183, 184 and 185 engage the switch arm 181 to effect a relatively rapid movement of the table 2 when the cutting tool 6 disengages the work and the dogs 186, 187 and 188 operate the switch arm 182 just prior to the engagement of the cutting tool 6 with the work. For illustrative purposes the switch arms 181 and 182 are shown in different positions on the bed 1 of the planer but if so desired such switch arms may be mounted on the same axis. At the beginning of the cutting stroke the magnet 191 of the contactor 178 is energized by a circuit which extends from one terminal of the exciter armature 31 through the contact fingers 154 and 147, which are bridged by the contact segment 140, magnet 191 and the resistor 189 in parallel, resistor 190, switch 179 and the series field-magnet winding 33 to the other terminal of the exciter armature 31.

Just prior to the engagement of the cutting tool 6 with the work on the table 2 one of the dogs 186, 187 and 188 operate the switch arm 182 for opening the switch 180. The dogs 183, 184 and 185, which operate the switch arm 181 for opening the switch 179, do not hold the switch in open position. However, the closing of the switch 179 will not effect closing of the contactor 178 inasmuch as the resistor 189 is connected in parallel with the magnet 191.

When the switch arm 181 is operated at the end of a cutting operation to open the switch 179 the contactor 178 is released. At such time the circuit for the field-magnet winding 22 of the main motor 13 extends from one terminal of the exciter generator 31 through contact fingers 155 and 146, which are bridged by the contact segment 141, field-magnet winding 22, resistors 35 and 36, and the series field-magnet winding 33 to the other terminal of the exciter armature 31. Inasmuch as the two resistors 35 and 36 are included in the circuit of the motor field-magnet winding it is apparent the speed of the motor will be increased. The resistor 189 will permit sufficient current to flow through the magnet 191 for holding the contactor in closed position but will not permit sufficient current to flow through the magnet 191 for operating the contactor. However, upon opening of the switch 180, the magnet 191 is connected in series with the resistor 190 across the exciter generator 31. The contactor 178 is operated and the speed of the main motor 13 is reduced inasmuch as the circuit of the field-magnet winding 22 now only includes the resistor 35.

In the neutral position of the pilot switch 14 the main motor field-magnet winding 22 is connected across the exciter generator in series with the creep resistor 37 through the contact segment 138. When the pendent switch 38 is operated the circuit through the field-magnet winding 22 extends from one terminal of the exciter armature 31 through the resistor 37, field-magnet winding 22, resistor 35, switch arm 192, contact member 193, switch arm 173, contact member 175 and the series field-magnet winding 33 to the other terminal of the exciter armature 31. The resistor 37 decreases the current flow through the winding 22 and prevents creeping of the main motor.

It should be noted that the circuit above traced through the field-magnet winding 22 and the resistor 37 is completed at all times when the pendent switch 38 is operated and the pilot switch 14 is in any position. When the pendent switch 38 is operated the magnet 174 of the switch 170 is deenergized to move the switch arm 173 into engagement with the stationary contact member 175.

A switch 200, having an energizing coil 201 in series with the armature of the main motor 13, is provided for connecting the main motor field-magnet winding 22 directly across the exciter armature 31 upon starting of the main motor and upon abnormal loads. The switch 200 has a movable contact member 202 which engages a stationary contact member 203 upon operation of the switch. Upon operation of the switch 200, when the main motor 13 is started or when an abnormal load is placed upon it, a circuit is completed through the field-magnet winding 22 which extends from one terminal of the exciter armature 31 through the contact finger 155 and the contact finger 146 or contact finger 145 according to the planer stroke being effected, field-magnet winding 22, contact members 203 and 202, and the series field-magnet winding 22 to the other terminal of the exciter armature 31.

At the end of the cutting stroke, the contact segment 137 of the pilot switch completes a circuit for operating the auxiliary feed switch 50. The selector switch is assumed, as before set forth, in a position towards the left, as viewed in Fig. 3 of the drawings, in order to effect a feeding movement at the end of the return stroke. The circuit for operating the auxiliary feed switch 50 extends from one terminal of the exciter armature 31 through the magnet 102 of the auxiliary feed switch 50, contact fingers 120 and 121 of the limit switch, which are bridged by the contact segments 117 and 118, contact fingers 132 and 135 of the selector switch, which are bridged by the contact segments 128 and 124, contact fingers 151 and 142 of the pilot switch, which are bridged by the contact segment 137, contact fingers 164 and 169 of the pendent switch, which are bridged by the contact segment 159 and the series field-magnet winding 33 to the other terminal of the exciter armature 31. The auxiliary feed switch 50 is operated and a holding circuit therefore is completed which extends from one terminal of the exciter armature 31 through the magnet 102, contact fingers 120 and 121, which are bridged by the contact segments 117 and 118, switch arm 100, contact member 105, resistor 107, contact fingers 164 and 169, which are bridged by the contact segment 159, and the series field-magnet winding 33 to the other terminal of the exciter armature 31.

The auxiliary feed switch 50 is held in closed position until operation of the limit switch 116. No movement of the feed motor 7 is effected at this time. However, upon movement of the pilot switch 14 towards the left, as viewed in Fig. 3 of the drawings, at the end of the return stroke, a circuit is completed through the auxiliary feed switch 50 for operating the main feed switches 45 and 46. The circuit for operating the main feed switches 45 and 46 extends from one terminal of the exciter armature 31 through the coils 64 and 56 of the feed switches 46 and 45 in parallel, contact members 88 and 87 of the switch 53, switch arm 84, contact member 106, switch arm 101, contact fingers 134 and 131 of the auxiliary switch 54, which are bridged by the contact segments 127 and 123, contact fingers 150 and 151, which are bridged by the contact segment 137, contact fingers 169 and 164, which are bridged by the contact segment 159 and the series field-magnet winding 33 to the other terminal of the exciter armature 31. The two feed switches 45 and 46 are operated for completing a circuit for operating the feed motor 7.

The circuit through the feed motor 7 extends from one terminal of the exciter armature 31 through the resistor 108, contact members 61 and 60, switch arm 55, armature 41, winding 44, switch arm 72, contact members 77 and 78, contact members 66 and 65, switch arm 63, resistor 52, series field-magnet winding 42, and the series field-magnet winding 33 to the other terminal of the exciter armature 31.

Upon operation of the feed motor 7 the switch 115 is mechanically closed by it. The switch 115 completes a circuit for operating the switch 109 which in turn short circuits the torque resistor 108. The circuit completed for energizing the magnet 111 of the switch 109 extends from one terminal of the exciter armature 31 through the magnet 111, switch 115, contact member 104, switch arm 99, contact fingers 169 and 164, which are bridged by the contact segment 159, and the series field-magnet winding 33 to the other terminal of the exciter armature 31. Upon operation of the switch 109 a holding circuit is completed through the magnet 111. The holding circuit extends from one terminal of the exciter armature 31 through the coil 111, switch 114, contact member 104, switch arm 99, contact fingers 169 and 164, which are bridged by the contact segment 159, and the series field-magnet winding 33 to the other terminal of the exciter armature 31. Upon operation of the switch 109 the torque resistor 108 is excluded from the circuit of the feed motor 7 for permitting a feeding operation to take place.

The accelerating switch 51 is operated to short-circuit the accelerating resistor 52. The circuit for operating the accelerating switch 51 extends from one terminal of the armature 41 through the switch arm 72, contact members 78 and 77, contact members 66 and 65, switch arm 63, magnet 81, and switch 62, to the other terminal of the armature 41.

At the end of the feeding movement the limit switch 116 is operated to release the auxiliary feed switch 50 and accordingly to release the main feed switches 45 and 46. The limit switch 116 also is operated to effect operation of the auxiliary feed switch 49 at the end of the next cutting stroke. The auxiliary feed switches are operated alternately in the above manner by the limit switch 116. In the new position of the limit switch 116 the auxiliary feed switch 49 is operated at the end of the cutting stroke by a circuit which extends from one terminal of the exciter armature 31 through the magnet 94, contact fingers 121 and 122, which are bridged by the contact segments 118 and 119, contact fingers 132 and 135, which are bridged by the contact segments 124 and 128, contact fingers 142 and 151, which are bridged by the contact segments 137, contact fingers 164 and 169, which are bridged by the contact segment 159 and the series field-magnet winding 33 to the other terminal of the exciter armature 31. The auxiliary feed switch 49 is operated and a holding circuit for the magnet 94 is completed by the switch arm 92 in the same manner in which the switch arm 100 completed a holding circuit through the magnet 102 of the auxiliary feed switch 50.

At the end of the return stroke a circuit is completed through the switch arm 91 for operating the two feed switches 45 and 46. The circuit completed through the switch arm 91 extends from one terminal of the exciter armature 31 through the coils 56 and 64 of the main feed switches 45 and 46 in parallel, contact members 88 and 87, switch arm 84, contact member 96, switch arm 91, contact fingers 134 and 131, which are bridged by the contact segments 127 and 128, contact fingers 150 and 151, which are bridged by the contact segment 137, contact fingers 164 and 169, which are bridged by the contact segment 159 and the series field-magnet winding 33 to the other terminal of the exciter armature 31. The feed switches 45 and 46 are operated and a circuit is completed through the feed motor 7 as heretofore traced. In the released position of the feed switch 45 and the traverse switch 48 it may be noted a dynamic braking circuit for the feed motor is completed through a resistor 210.

The switch arm 93 of the auxiliary feed switch 49 completes a holding circuit for the magnet 111 of the switch 109 in the same manner as the switch arm 99 of the auxiliary feed switch 50 completed a holding circuit for such magnet. The switch 109 is operated for short circuiting the torque resistor 108 in the same manner as heretofore described and traced when reference was made to the auxiliary feed switch 50. Moreover the accelerating feed switch 51 is operated in the same manner and by the same circuit as heretofore described in explaining the operation of the auxiliary feed switch 50.

The selector switch 54 serves to select the end of the planer stroke at which movement of the feed motor will take place. In the description heretofore given the selector switch is assumed to be moved towards the left, as viewed in Fig. 3 of the drawings, so that feeding takes place at the end of the return stroke. When feeding movement takes place at the end of the cutting stroke the feeding movement is delayed in order to prevent spoiling the work. The delay of the feed movement at the end of the cutting stroke is effected by means of the switch 53.

When the selector switch is moved towards the right, a circuit is completed at the end of the return stroke of the planer for operating one of the auxiliary feed switches 49 and 50. The circuit for operating the auxiliary feed switch 50 may be traced from one terminal of the exciter armature 31 through the magnet 102 of the auxiliary feed switch 50, contact fingers 120 and 121, which are bridged by contact segments 117 and 118, contact fingers 132 and 131, which are bridged by the contact segment 126, contact fingers 150 and 151, which are bridged by the contact segment 137, contact fingers 164 and 169, which are bridged by the contact segment 159, and the series field-magnet winding 33 to the other terminal of the exciter armature 31. After operation of the auxiliary feed switch 50 a circuit is completed for operating the two main feed switches 45 and 46 when the pilot switch 14 is at the end of the cutting stroke. The circuit through the main feed switches extends from one terminal of the exciter armature 31 through the coils 56 and 64 in parallel, contact members 88 and 87, switch arm 84, contact member 106, switch arm 101, contact fingers 134 and 135, which are bridged by the contact segment 130, contact fingers 151 and 142, which are bridged by the contact segment 137, contact fingers 164 and 169, which are bridged by the contact segment 159 and the series field-magnet winding 33 to the other terminal of the exciter armature 31. The operation of the two auxiliary feed switches 49 and 50, when the selector switch is in a position toward the right as viewed in Fig. 3, is the same as above described in the opposite position of the selector switch.

When a feeding movement is effected at the end of the cutting stroke as last assumed, the switch 53 is held open by the magnet 86 for a limited period of time. The magnet 86 is connected across the armature 27 of the main generator 26 by a circuit which extends from one terminal of the armature 27 through the magnet 86, and contact fingers 136 and 133, which are bridged by the contact segments 129 and 125 to the other terminal of the armature 27. The magnet 85 is connected across the armature 41 of the feed motor 7 and acts in opposition to the magnet 86. At the end of a cutting stroke the magnet 86 will be energized to hold the switch 53 in open position and will maintain the switch in such position until the current in the armature 27 of the main generator 26 dies down. When the current in the armature 27 is reduced to a predetermined point the spring 89 of the switch 53 operates the switch arm 84 to engage the contact members 87 and 88. When the switch 53 is once closed the magnet 85 is powerful enough to overcome the magnet 86. Referring to the selector switch, it should be noted the contact segments 125 and 129 permit the operation of the switch 53 to effect a delayed feed only when feeding is effected at the end of the cutting stroke.

Attention is called to the fact that the auxiliary switch 67 operated by the main feed switch 46 completes a holding circuit for the magnets of the feed switches 45 and 46 which is independent of the pilot switch 14. Thus, a feeding movement will be completed independent of any movement of the pilot switch. Feeding movement, when once started, can only be stopped or limited by the limit switch 116. The holding circuit completed by the switch 67 extends from one terminal of the exciter armature 31 through the magnets 56 and 64 in parallel, switch 67, switch arm 99 or 93 according to the auxiliary switch which is operated, contact fingers 164 and 169, which are bridged by the contact segment 159, and the series field magnet winding 33 to the other terminal of the exciter armature 31.

The pendent switch 38 serves not only to operate the main motor 13 at will for effecting a traverse movement of the work table but also serves for operating the feed motor 7. In the first operative position of the pendent switch 38 the contact segment 159 is moved to bridge either the contact fingers 162 and 163 or to bridge the contact fingers 167 or 168. Upon bridging of either of said sets of contact fingers by the contact segment 159, the two traverse switches 47 and 48 are operated for completing a circuit through the feed motor 7. The circuit for operating the traversing switches 47 and 48 extends from one terminal of the exciter armature 31 through magnets 69 and 73 in parallel, contact fingers 162 and 163, which are bridged by the contact segment 159, and the series field-magnet winding 33 to the other terminal of the armature 31.

The traverse switches 47 and 48 complete a circuit which extends from one terminal of the exciter armature 31 through contact fingers 75 and 76, switch arm 72, winding 44, armature 41, switch arm 55, contact members 58 and 59, contact members 71 and 70, switch arm 68, resistor 52, series field-magnet winding 42, and the series field-magnet winding 33 to the other terminal of the exciter armature 31. During traverse operation it should be noted the feed motor is operated in a reverse direction to that which it is operated during feeding movement. The holding magnets 57 and 74 for the switches 45 and 48 are connected directly across the armature of the feed motor. Moreover the holding magnets 95 and 103 for the auxiliary feed switches 49 and 50 are connected across the armature of the feed motor.

In the uppermost position of the pendent switch 38 the main motor 13 is operated to effect a traverse movement of the table 2 in either direction. When the handle of the pendent switch is given a rotative movement towards the left, as viewed in Fig. 3 of the drawings, the circuit for the field winding 28 of the main generator 26 extends from one terminal of the exciter generator 31 through the resistor 40, contact fingers 165 and 166, which are bridged by the contact segment 158, winding 28, contact fingers 161 and 162, which are bridged by the contact segment 159, and the series field-magnet winding 33 to the other terminal of the exciter armature 31. At this time the field winding 22 of the main motor 13 is energized by a circuit which extends from one terminal of the exciter armature 31 through the creep resistor 37, winding 22, resistor 35, switch arm 192, contact member 193, switch arm 173, contact member 175, and the series field-magnet winding 33 to the other terminal of the exciter armature 31.

If it is desired to operate the main motor 13 in a reverse direction the pendent switch 38 is so operated that the contact segment 158 bridges the contact fingers 160 and 161 and the contact segment 159 bridges the contact fingers 166 and 167. When the pendent switch is so positioned the circuit for the field winding 28 of the main generator 26 extends from one terminal of the exciter armature 31 through the resistor 40, contact fingers 160 and 161, which are bridged by the contact segment 158, winding 28, contact fingers 166 and 167 which are bridged by the contact segment 159, and the series field-magnet winding 33 to the other terminal of the exciter armature 31.

Modifications in the system and in the arrangement and location of parts may be made within the spirit and scope of my invention and such modifications are intended to be covered by the appended claims.

What I claim is:

1. In a planer control system, the combination comprising a reciprocating table, a motor having armature and field-magnet windings for reciprocating said table, resistors in circuit with the motor field-magnet winding, means for controlling the direction of rotation of the motor in accordance with the movement of the table, means for including all of said resistors in the field winding during the return stroke to the motor at a faster speed during the return stroke than during the cutting stroke, and means for controlling said resistors to vary the speed of the motor during the cutting stroke so as to reduce the motor speed only when a cutting operation is being effected.

2. In a planer control system, the combination comprising a reciprocating work table, a motor having armature and field-magnet windings for reciprocating said table, resistors included in the field-magnet winding circuit, switches for controlling said resistors, means for controlling the direction of the motor rotation in accordance with the movement of said table, means for varying said resistors according to the direction of the motor rotation, all of said resistors being included in the circuit of the field winding during the return stroke, and means carried by said table for controlling said switches to control said resistors and vary the motor excitation during a cutting stroke to reduce the motor speed when a cutting operation is being effected and to increase the motor speed when no cut is being taken.

3. In a planer control system, the combination comprising a reciprocating work table, a motor having armature and field-magnet windings for reciprocating said table, means for controlling the direction of the motor rotation in accordance with the movement of said table, resistors in circuit with said motor field-magnet windings, means for controlling said resistors to operate the motor at a faster speed during the return stroke than during the cutting stroke, all of said resistors being included in the circuit of the field winding during the return stroke, and means for varying said resistors during a cutting stroke to control the motor speed.

4. In a planer control system, the combination comprising a reciprocating work table, a motor for reciprocating said table, resistors included in the field-magnet winding circuit of the motor, means for controlling the direction of the motor rotation in accordance with the movement of said table, means for controlling said resistors at the ends of the table stroke to operate the motor at a faster speed during the return stroke than during the cutting stroke, all of said resistors being included in the circuit of the field winding during the return stroke, and means comprising dogs operated by the table and switches operated by the dogs for controlling said resistors to vary the current flowing through the motor field windings during a cutter stroke to reduce the motor speed when a cutting operation is being effected and to increase the motor speed when no cut is being taken.

5. In a planer control system, the combination comprising a reciprocating table, a motor for reciprocating said table, means for controlling said motor in accordance with the movement of the table, resistors included in the field winding circuit of the motor, means for inserting all of said resistors in the circuit of the field winding during the return stroke to effect the return stroke at a faster speed than the cutting stroke, dogs positioned along the table in accordance with the shape of the work carried by the table, and means comprising switches controlled by said dogs on the table for selectively controlling said resistors during the cutting stroke to vary the speed of the cutting stroke in accordance with the work being operated on.

6. In a planer control system, the combination comprising a reciprocating table, a motor for reciprocating said table, resistors included in the field magnet winding circuit of the motor, means for varying said resistors according to the direction of motor rotation, all of said resistors being included in the circuit of the field winding during the return stroke to increase the speed of the return stroke, means for controlling the direction of rotation of said motor in accordance with the movement of the table, dogs positioned along the table in accordance with the shape of the work, and means comprising switches controlled by the dogs on said table for controlling said resistors during one stroke to vary the motor speed during such stroke.

7. In a planer control system, the combination comprising a reciprocating table, a motor for reciprocating said table, resistors included in the circuit of the motor field magnet winding, means comprising a pilot switch for controlling the motor in accordance with the movement of the table and for controlling said resistors to effect the cutting stroke at a less speed than the return stroke, all of said resistors being included in the circuit of the field winding during the return stroke, and means for varying said resistors during a cutting stroke to reduce the motor speed only when a cutting operation is being effected.

8. In a planer control system, the combination comprising a reciprocating table, a motor for reciprocating said table, a generator for supplying current to the motor armature, an exciter for supplying current to the field windings of the motor and the field windings of the generator, resistors included in the circuit of the motor field-magnet windings, means comprising a pilot switch operated by the table for controlling the direction of current flow through the generator field winding to vary the direction of the motor rotation and for varying the amount of said resistors included in the motor field winding circuit to effect the cutting stroke and the return stroke at different speeds, all of said resistors being included in the circuit of the field winding during the return stroke, and means for varying said resistors during the cutting stroke.

9. In a planer control system, the combination comprising a reciprocating table, a motor for reciprocating said table, a generator for supplying current to the motor armature, an exciter for supplying current to the field windings of the motor and the field windings of the generator, resistors included in the circuit of the motor field-magnet windings, means comprising a pilot switch operated by the table for controlling the generator field windings to vary the directions of rotation of the motor, means for controlling the motor field windings to effect the cutting stroke and the return stroke at different speeds, all of said resistors being included in the circuit of the field winding during the return stroke, and means for varying said resistors during a cutting stroke to reduce the motor speed only when a cutting operation is being effected.

10. In a planer control system, the combination comprising a reciprocating table, a motor for operating said table, resistors included in the field winding circuit of the motor, means comprising a pilot switch operated by said table for controlling the direction of rotation of the motor and for controlling said resistors to vary the motor speed according to the direction of movement by the table, and means for excluding said resistors from the motor field winding circuit upon starting and upon abnormal loads.

11. In a planer control system, the combination comprising a reciprocating table, a motor for reciprocating said table, resistors included in the circuit of the motor field-magnet windings, means for controlling the direction of rotation of the motor in accordance with the movement of the table, means for controlling said resistors to effect a cutting stroke at a slower speed than the return stroke, and means for excluding said resistors from the motor field winding circuit upon abnormal current flow through the motor armature.

12. In a planer control system, the combination comprising a reciprocating table, a motor for reciprocating said table, resistors included in the circuit of the motor field-magnet winding circuit, means comprising a pilot switch operated by said table for controlling the direction of rotation of the motor and for varying said resistors to effect the cutting stroke and the return stroke at different speeds, and means comprising a switch having an energizing coil in series with the motor armature for excluding said resistors from the circuit of the motor field winding upon starting the motor and upon abnormal loads.

13. In a planer control system, the combination comprising a reciprocating table, a motor for reciprocating said table, means comprising a pilot switch for controlling the direction of the motor rotation in accordance with the movement of the table and for effecting the cutting stroke and the return stroke at different speeds, and means comprising a switch having an energizing coil in series with the motor armature for controlling the motor field winding to increase the current flow therethrough upon starting the motor and upon abnormal loads.

14. In a planer control system, the combination comprising a reciprocating table, a motor for reciprocating the table, a generator for energizing the motor armature, an exciter for energizing the field windings of the motor and the field windings of the generator, resistance in circuit with the motor field windings, a pilot switch for automatically controlling the direction of current flow through the generator field windings and for controlling the resistance in the motor field winding circuit according to the movement of said table, and means for connecting the motor field windings directly across the exciter upon abnormal loads.

15. In a planer control system, the combination comprising a reciprocating table, a motor for reciprocating the table, a generator for energizing the motor armature, means for energizing the motor field windings and the generator field windings, means operated by said table for controlling the direction of current flow through the generator field windings to control the direction of the motor rotation, resistors in the motor field winding current, means for varying said resistors in the circuit of the motor field windings according to the direction of the table movement, and means for excluding said resistors from the motor field winding circuit upon starting and upon abnormal loads.

16. In a planer control system, the combination comprising a reciprocating table, a motor for reciprocating the table, a generator for energizing the motor armature, means for energizing the motor field windings and the generator field windings, means operated by said table for controlling the direction of current flow through the generator field windings to control the direction of the motor rotation, resistors in the motor field winding circuit, means for varying said resistors in the circuit of the motor field windings according to the directon of the table movement, and means comprising a switch having an energizing coil in series with the motor armature for excluding said resistors from the circuit of the motor field winding upon starting the motor and upon abnormal loads.

17. In a planer control system, the combination comprising a reciprocating table, a motor for reciprocating said table, a generator for energizing the motor armature, an exciter for energizing the motor field windings and the generator field windings, means comprising a switch for automatically controlling the direction of rotation of the main motor according to the movement of the table, means comprising field resistors for varying the excitation of the motor field windings during operation of the motor by the automatic switch, a second switch for controlling the direction of rotation of the main motor at will, a creep resistor independent of said field resistors, and means for energizing the motor field winding at reduced voltage through said creep resistor when the second switch is operated.

18. In a planer control system, the combination comprising a reciprocating table, a motor for reciprocating said table, a generator for energizing the motor armature, means for energizing the field windings of the motor and the generator, a pilot switch for controlling the direction of rotation of the main motor in accordance with the movement of said table, a resistor, and means for completing a circuit to energize the motor field windings in series circuit with said resistor whenever the pilot switch is moved to neutral position.

19. In a planer control system, the combination comprising a reciprocating table, a motor for reciprocating said table, a generator for energizing the motor armature, an exciter for energizing the motor and the generator field windings, a pilot switch for controlling the direction of current flow through the generator field windings in accordance with the table movement, a creep resistor and means for connecting said creep resistor in series circuit with the motor field winding across the exciter whenever the pilot switch is moved to neutral position.

20. In a planer control system, the combination comprising a reciprocating table, a motor for reciprocating said table, a generator for energizing the motor armature, an exciter for energizing the motor field windings and the generator field windings, a pilot switch for controlling the direction of current flow through the generator field windings in accordance with the table movement, a pendent switch for controlling the direction of current flow through the generator field windings at will, and a contactor for connecting the motor field windings across the exciter when the pendent switch is in an operative position.

21. In a planer control system, the combination comprising a reciprocating table, a motor for operating said table, a generator for supplying current to the armature of said motor, an exciter for supplying current to the field windings of said motor and the field windings of said generator, a pilot switch operated by said table for controlling the current flow through the generator field windings to reverse the direction of rotation of the main motor, a pendent switch for controlling the direction of current flow through the generator field windings at will, means comprising a relay controlled by the pendent switch for preventing control of the generator field windings by the pilot switch when the pendent switch is in operation, a creep resistor, and means comprising an auxiliary switch closed in the off position of said relay for connecting the main motor field winding through said creep resistor across the exciter when the pendent switch is in operation.

22. In a planer control system, the combination comprising a reciprocating table, a main motor for reciprocating said table, a feed motor, a motor generator set for supplying power to the main motor and the feed motor, a pilot switch for controlling said set to control the main motor rotation in accordance with the movement of said table, an accelerating and a torque resistor included in the circuit of the feed motor, means operated by the pilot for operating the feed motor at only one end of the table stroke, means mechanically operated after a predetermined rotation of the feed motor for excluding the torque resistor from the feed motor circuit, and automatic means for short circuiting the accelerating resistor to accelerate the feed motor.

23. In a planer control system, the combination comprising a reciprocating table, a main motor for reciprocating said table, a feed motor, a motor-generator set for supplying power to the main motor and the feed motor, a pilot switch for controlling said set to control the main motor rotation in accordance with the movement of said table, an accelerating and a torque resistor included in the circuit of the feed motor, means controlled by the pilot switch for effecting feeding movements by the feed motor, means controlled by the feed motor for excluding the torque resistor from the feed motor circuit after the feed motor has made a predetermined movement, and automatic means for short circuiting the accelerating resistor to accelerate the feed motor.

24. In a planer control system, the combination comprising a reciprocating table, a main motor for reciprocating said table, a feed motor operated at only one end of the table stroke, a motor-generator set for supplying power to the main motor and the feed motor, a pilot switch for controlling said set to control the main motor rotation in accordance with the movement of said table, and means operated by the pilot switch at one end of the table stroke to prepare a circuit for operating the feed motor and operated by the pilot switch at the opposite end of the stroke to complete the circuit for operating the feed motor.

25. In a planer control system, the combination comprising a reciprocating table, a main motor for reciprocating said table, a feed motor operated at only one end of the table stroke, a motor-generator set for supplying power to said main motor, an exciter generator operated by said set for supplying current to the feed motor and the field magnet windings of the main motor and the generator of the set, means comprising a pilot switch for controlling the field circuit of the motor-generator set to operate the main motor in accordance with the movement of the table, and means operated by the pilot switch at one end of the table stroke to prepare a circuit for operating the feed motor and operated by the pilot switch at the opposite end of the stroke to complete the circuit for operating the feed motor.

26. In a planer control system, the combination comprising a reciprocating table, a main motor for reciprocating said table, a feed motor, a motor-generator set for supplying power to the main motor and the feed motor, a pilot switch for controlling said set to control the main motor rotation in accordance with the movement of said table, a limit switch operated by the feed motor for limiting the feeding movement, means operated by the pilot switch for initiating the movement of the feed motor, and means for limiting the movement of the feed motor irrespective of the movement of the pilot switch.

27. In a planer control system, the combination comprising a reciprocating table, a main motor for reciprocating said table, a feed motor, a motor-generator set for supplying power to said main motor, an exciter generator operated by said set for supplying current to the feed motor and the field magnet windings of the main motor and the generator of the set, means comprising a pilot switch for controlling the field circuit of the motor-generator set to operate the main motor in accordance with the movement of the table, a limit switch operated by the feed motor for limiting the movement of the feed motor, means operated by the pilot switch for initiating the movement of the feed motor, and means for insuring the limiting of the movement of the feed motor by the limit switch irrespective of the movement of the pilot switch.

In testimony whereof, I hereto affix my signature.

ROBERT C. DEALE.